June 30, 1970      E. J. SKIERSKI      3,517,542
COMPLEMENTARY FINISHING DIES
Original Filed July 5, 1968      2 Sheets-Sheet 1
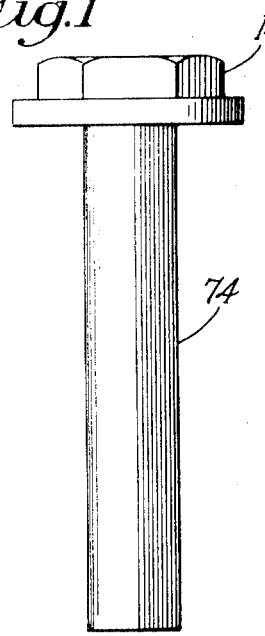
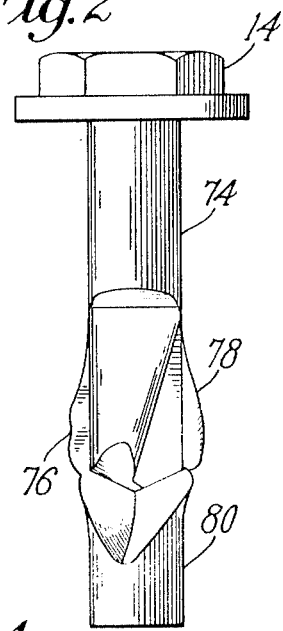
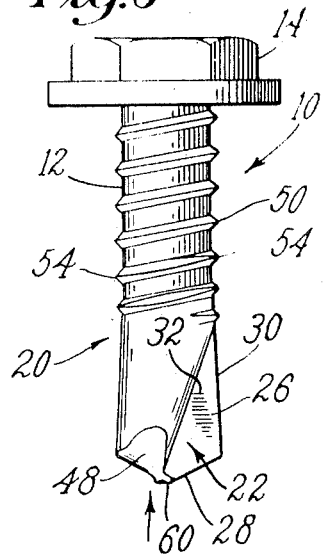
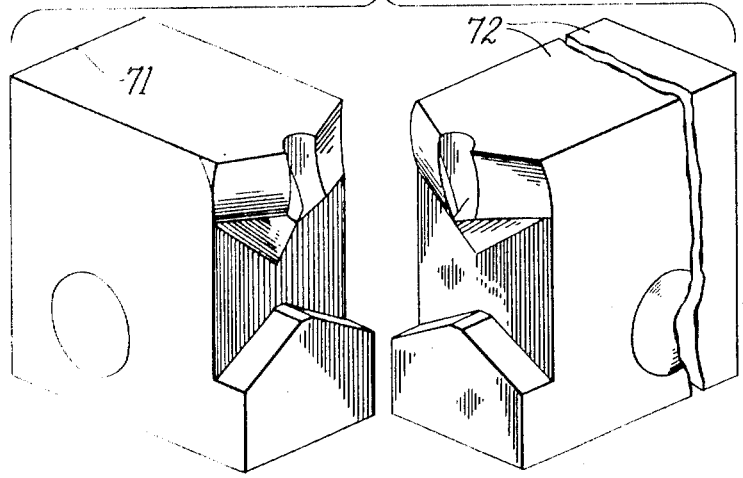
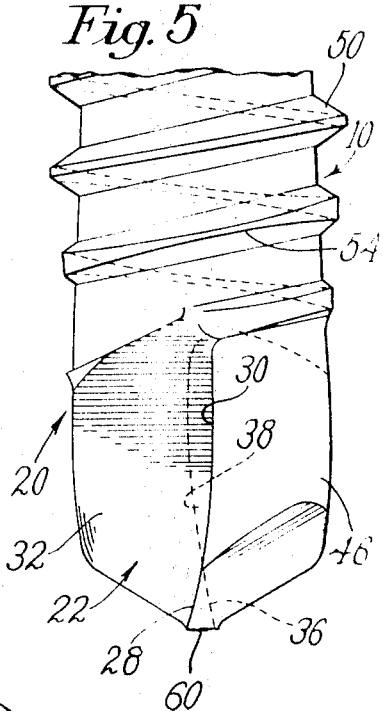
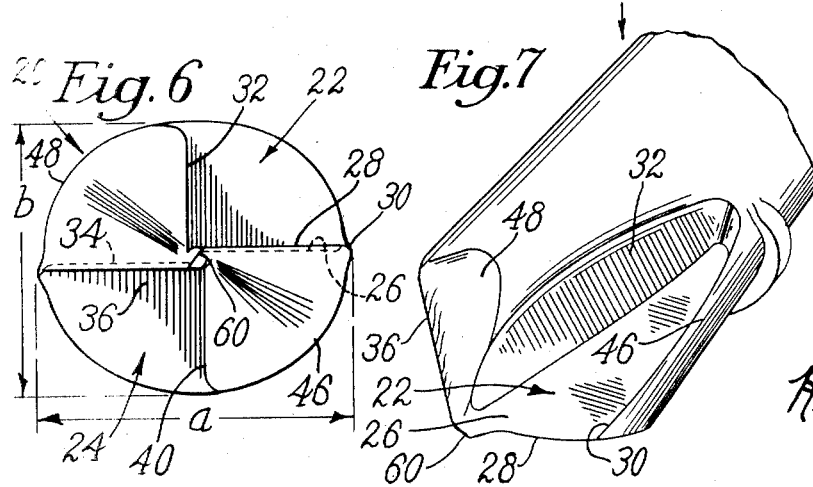
*Inventor*
Edwin J. Skierski
By his Attorney
Richard B. Megley June 30, 1970  E. J. SKIERSKI  3,517,542
COMPLEMENTARY FINISHING DIES
Original Filed July 5, 1968  2 Sheets-Sheet 2

United States Patent Office 3,517,542
Patented June 30, 1970

3,517,542
COMPLEMENTARY FINISHING DIES
Edwin J. Skierski, Riverside, Conn., assignor to Parker-Kalon Corporation, Clifton, N.J., a corporation of Delaware
Original application July 5, 1968, Ser. No. 742,736. Divided and this application June 26, 1969, Ser. No. 836,771
Int. Cl. B21h 3/06
U.S. Cl. 72—469               3 Claims

ABSTRACT OF THE DISCLOSURE

Complementary finishing dies comprising a first die having a thread forming member and a deburring member and cam member for removing excess material. A second die having a thread forming member and a deburring member.

BACKGROUND OF THE INVENTION

The present application is a division of U.S. application for Letters Patent Ser. No. 742,736, filed July 5, 1968.

This invention relates to dies for manufacturing a rotary threaded fastener or screw having novel features which permit the screw to cut a pilot hole and swage threads therein without the need for any pre-drilling or the like. More specifically, this invention is particularly related to dies for use in the manufacture of screws such as disclosed in U.S. Pat. No. 3,395,603, issued Aug. 6, 1968 in the name of E. J. Skierski.

Normal practice in forming cutting edges on the pilot end or entering portion of a screw is to machine grooves or slots, of a shape dictated by the particular design, in a screw blank without altering the shape of the resultant "land" portions intermediate the grooves. That is, the conventional circular cross-section screw blank generally has two cutting edges milled therein but the remaining portion of the circumference of the blank at the pilot end is left in an arcuate form corresponding in curvature and diameter to the main shank body. As a result, these "lands" or arcuate portions engage the member into which the screw is inserted during the cutting operation. This engagement increases the torque required to perform the cutting operation due to the frictional drag forces resulting from such engagement. The apparatus of the present invention provides means for manufacturing an improved screw having a pilot end of essentially elliptical transverse configuration wherein the cutting edges define the major axis of the ellipse and the intermediate "lands" define the minor axis. With this improved construction, the "lands" do not engage a member in which a pilot hole is cut, thus minimizing the torque required for insertion.

As noted above, normal practice has been to machine the cutting edges in the pilot end of the screw blank. This is a relatively costly operation. Dies are employed to pinch or punch the cutting edges in screws manufactured in accordance with the invention disclosed in my U.S. Pat. No. 3,395,603. The novel method which permits this practice, as disclosed in my copending application of which this application is a division, and the unique dies and thread forming means which form the subject matter of this application provide a relatively inexpensive means of manufacturing screws of this type at a production rate heretofore impossible.

Accordingly, it is an object of this invention to provide unique dies for threading a screw and removing excess material from the pilot end thereof.

To this end and in accordance with a feature of this invention there is provided novel complementary dies for threading the shank of a screw and removing excess material from the pilot end thereof.

The above and other features of the invention, together with various novel details of construction, will now be more particularly described with reference to the accompanying drawings and pointed out in the claims. It is to be understood that the particular embodiment of the invention shown in the drawings is for illustration purposes only and is not to be construed as a limitation of the invention.

DRAWING DESCRIPTION

FIG. 1 is a side elevation of a metal screw blank prior to punching and threading;

FIG. 2 is a side elevation of the screw blank following the pointing or punching operation and prior to the threading operation;

FIG. 3 is a side elevation of a completed metal screw which is formed by threading the screw blank shown in FIG. 2;

FIG. 4 is a perspective view of a pair of dies particularly constructed to perform the punching operation the results of which are shown in FIG. 2;

FIG. 5 is an enlarged view of the screw illustrated in FIG. 3 as viewed from a 90° angle;

FIG. 6 is an end view of the entering portion or pilot end illustrated in FIGS. 3 and 5;

FIG. 7 is a perspective view of the pilot end of the screw shown in FIGS. 3, 5 and 6;

DESCRIPTION OF THE PREFERRED EMBODIMENT

Figure 8:
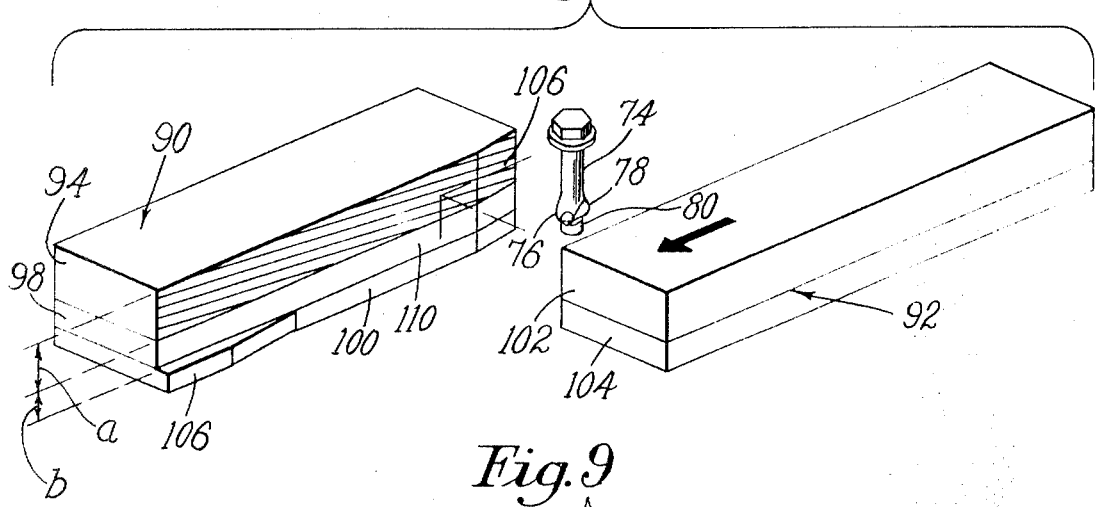
FIG. 8 is a perspective view of the complementary finishing dies employed in the method of this invention, a screw being shown in position prior to the thread rolling operation and the dies spaced apart to facilitate illustration thereof.

In order fully to appreciate the advantages of the subject invention, an understanding of the fastener produced thereby is necessary. Accordingly, the specification will initially describe the preferred embodiment of a screw disclosed in the aforementioned U.S. Pat. No. 3,395,603 as an example of products which may be manufactured by the present invention.

A preferred embodiment of the screw 10 is illustrated in FIGS. 3, 5, 6 and 7. As shown in FIG. 3 the screw 10 comprises an elongated shank 12 having a head section 14 integral with a trailing end thereof. The head section may be provided with any convenient, conventional means cooperative with a tool for turning the screw to effect insertion or withdrawal.

The screw 10 has a pilot end 20 of substantially elliptical transverse configuration as viewed in FIG. 6. The term elliptical is here used for purposes of description or visualization only and it is not intended in a strict mathematical sense. Longitudinally extending flutes or slots 22, 24 of similar construction are formed in opposite quadrants of the pilot end. The flute 22 is defined by a cutting surface 26 having cutting edges 28, 30 and by a drag surface 32. The flute 24 is defined by a cutting surface 34 having cutting edges 36, 38 and by a drag surface 40. The cutting surfaces 26 and 34 are, preferably, slightly arcuate and lie generally in a plane which has a small amount of angularity with respect to the longitudinal axis of the screw whereby to facilitate removal of material from the cutting edges during the cutting operation. The contours of the surfaces 26 and 34, as best seen in FIGS. 5 and 6, provide the proper cutting angle and rake at the cutting edges 28 and 36. The drag surfaces 32 and 40 are also angularly disposed with respect to the longitudinal axis of the screw to facilitate discharge of material removed in the cutting operation.

As most clearly indicated in FIG. 6, the maximum width of the cutting surfaces 26 and 34 is greater than the maximum width of the drag surfaces 32 and 40. That is, the cutting surfaces 26, 34 lie generally offset from and parallel to the transverse major axis (a) of the elliptical pilot end whereby essentially to define the major axis. The drag surfaces lie in a similar relation to the transverse axis (b). Accordingly, a pilot hole cut by the cooperative action of the cutting edges 28, 30 and 36, 38 of the cutting surfaces 26 and 34, respectively will be of greater diameter than the minor axis (b) of the pilot end. Thus, the drag surfaces 32 and 40 which may be considered to define the minor axis (b) will not engage the sidewalls of a pilot hole cut by the cutting edges. Similarly, the arcuate portions of the pilot end intermediate the cutting and drag surfaces, hereinafter referred to as lands 46 and 48, will also not engage the sidewalls of a pilot hole. That is, the lands 46, 48 progress transversely in generally arcuate contour from a minimum radius at the drag surface to a maximum radius at the cutting surface. A difference of approximately 10% in the length of the major and minor axis has been found adequate to ensure clearance by the lands 46 and 48, and, accordingly, is preferred.

The construction just discussed thus provides a self cutting screw which may be used to cut a pilot hole by the application of substantially less driving torque than required to insert screws disclosed by the prior art. Frictional drag has been reduced to a minimum. The only frictional forces are those necessary to accomplish the cutting operation.

The lands 46 and 48, see particularly FIG. 7, are generally bulbous in longitudinal contour. This construction allows maximum reinforcement for the cutting surfaces 26 and 34 which essentially constitute a leading end of the lands. That is, the bulbous or convex contour of the lands permit the provision of a maximum amount of material to absorb the forces generated by the cutting operation and the maintenance of the elliptical configuration discussed above.

As best illustrated in FIG. 3, in the preferred embodiment the cutting edges 30 and 38 are tapered toward the trailing end of the screw. That is, the transverse major axis of the generally elliptical pilot end decreases in length in the direction of the trailing end. This also facilitates the escape of material removed during the cutting operation and decreases the effective cutting contact area whereby to minimize frictional drag.

Helical thread convolutions 50 are formed on the trailing portion of the shank. In the preferred embodiment, the major axis (a) of the generally elliptical pilot end 20 is of greater length than the root diameter of the threads on the shank 12, see particularly FIG. 3. Thus, the pilot end will cut a pilot hole of greater diameter than the root diameter of the shank 12. In the preferred embodiment, the transverse major axis of the pilot end has a maximum length at its widest point equal to approximately the root diameter plus one-half of the difference between the crest and root diameters. Thus, the pilot end cuts a pilot hole larger than is actually necessary. However, this size pilot hole permits the threads 50 to swage the material engaged by the crest portions of the threads into the voids proximate to the root diameter of the shank whereby to achieve complete contact of the threads 50 with the member in which the screw is inserted. This construction reduces the cutting or swaging which must be completed by the threads 50 and thereby reduces the required driving torque.

The elliptical configuration discussed in relation to the pilot end 20 extends to and includes that portion of the threaded shank which comprises the first two threads adjacent the pilot end, i.e. in the preferred embodiment. Thus, the initial threading or tapping of the pilot hole is accomplished by what may be defined as lobes 54 spaced 180° apart on each of the first two threads. The lobes 54 are located at the major axis of the elliptical cross-section. That is, the portions of the first two threads at the minor axis have a larger land width and therefore a lower crest height than at the major axis. Compare FIGS. 3, and 5 in this regard. This construction substantially reduces the driving torque required for insertion and improves the stripping qualities. The lobes 54 effect progressive internal threading of the pilot hole with a minimum frictional contact during the initial phase of thread forming.

The pilot end 20 is provided with a pointed tip 60 which aids in initial positioning and cutting. The tip 60 extends slightly in advance of the cutting edges 28, 36.

The novel screw structure described above readily could be produced by employing standard machining practices to mill the flutes 22 and 24, etc. However, as in other applications where such standard practices are used, the cost would be high. Applicant has developed a unique method of manufacturing his fastener by the utilization of punching dies 71, 72 shown in FIG. 4 and finishing dies 90, 92 illustrated in FIGS. 8 to 10. A primary obstacle to the use of the dies 71, 72, however, is that if the dies are employed on a screw blank without preparatory treatment, the blank will be hardened and crack under the pressures generated in the use of the dies. That is, if a standard screw blank is exposed to the pinching or punching pressures exerted by the dies 71, 72, the blank will crack in the vicinity of the flutes 22, 24 and will be of otherwise poor quality.

Applicant has found that if he anneals a screw blank such as indicated by 74 of FIG. 1, he is able successfully to form a screw of excellent quality. The result of the use of the dies 71, 72 on the blank 74 is shown in FIG. 2. The annealing operation lends sufficient ductility to permit the metal to flow whereby to form ears 76, 78 and a head 80 on the blank 74. The ductility of the blank 74 enables it to withstand the pressures of forming without cracking at the points of maximum stress. The ears 76, 78 and the head 80 remain integral with the blank 74 after the die-punching operation and prevent abrasion of the cutting edges prior to the threading or finishing step.

After the blank 74 is punched, the shank portion is threaded, the ears 76, 78 removed and the head 80 removed by use of the complementary finishing dies 90, 92 as hereafter discussed. The die 90 comprises a thread forming member 94, a deburring member 98 and a cam member 100. The die 92 comprises a thread forming member 102 and deburring member 104 respectively complementary to the members 94 and 98 of the die 90 and of similar construction. Accordingly, the discussion to follow will be directed to the die 90 for simplicity, it being understood that the complementary members of the die 92 are of similar construction. The dies are shown in spaced relation in FIGS. 8 to 10 to permit illustration of their operation. In actual use, the dies would be mounted in standard die holding apparatus and have a standard spacing and stroke.

The thread forming member 94 has a plurality of conventional thread forming grooves 106 formed on a surface thereof. The height (a) of the thread-forming member may be varied to accommodate screws of different length. That is, the height (a) of the thread-forming member is determined by the length of screw shank to be threaded. As shown pictorially in FIGS. 8 to 10, the die 92 is movable relative to the die 90 to accomplish threading of the shank of a screw blank. As stated above relative to the preferred embodiment of a screw manufactured pursuant to this invention, a portion of the shank next adjacent the pilot end is deformed into elliptical configuration in the punching operation discussed above. Exposure of this elliptical portion of the shank to the thread-forming action of the complementary dies produces lobes 54 in accordance with the above described construction.

Figure 9:
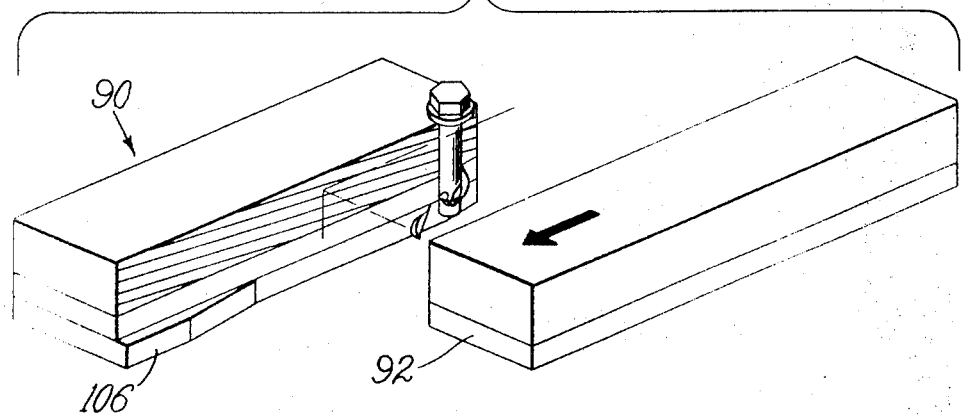
FIG. 9 is a perspective view similar to FIG. 8 with the screw in engagement with one of the said dies.
Figure 10:
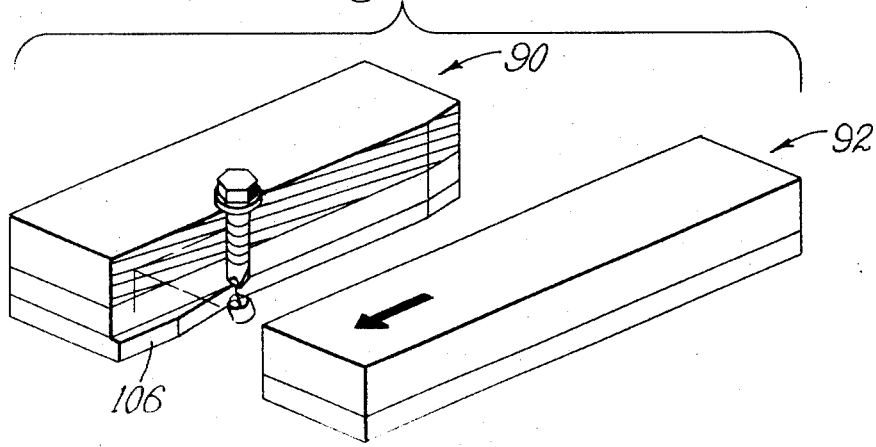
FIG. 10 is a perspective view similar to FIG. 9 with the screw at an advanced location relative to said dies.

The deburring member 98 of the die 90 dimensionally corresponds to the thread-forming member 94 except for the height (b) thereof. The deburring member functions to remove the ears 76, 78 from a screw during the threading operation and, therefore, the height (b) is determined by the height of the ears 76, 78 formed on a particular screw blank size. The work engaging surface 110 of the deburring member comprises an elongated flat surface. In use, the dies 90 and 92 are positioned in standard die holding apparatus such that the members 98 and 104 will be in vertical alinement with the ears 76, 78 of a screw to be threaded. Conventional spacing means may be used in this regard and to compensate for the member 100 associated with the die 90 whereby vertically to aline the complementary die members. The ears 76 and 78 are broken away from the screw blank during the thread-forming stroke of the die 92 by engagement with the members 98 and 104 as illustrated in FIG. 9. Sharp cutting edges are provided as a result of this operation.

The cam member 100 removes the head 80 of a screw during the stroke of the die 92. The cam member corresponds dimensionally to the member 94 except for a cam portion 106 projecting therefrom in position to engage the head 80 of a screw located in threading relation between the dies 90, 92. As illustrtaed in FIG. 10, engagement of the head 80 with the cam portion 106 causes the head 80 to be broken off during the stroke of the die 92.

Having thus described my invention, what I claim as new and desire to secure by Letters Patent of the United States is:

1. Complementary dies for use in the manufacture of a self-drilling and thread-forming screw having flutes in the pilot end thereof formed by punching comprising a first die having a thread forming member for forming threads on the shank of the screw, a deburring member for removing excess material from the longitudinal boundaries of the flutes, and a cam member for removing excess material from the leading end of the pilot end of the screw and a second die having a thread forming member complementary to the thread forming member of said first die.

2. Complementary dies according to claim 1 wherein said second die has a deburring member complementary to the deburring member of said first die.

3. Complementary dies according to claim 1 wherein said cam member has a cam portion projecting therefrom in position to engage excess material on the leading end of the pilot end of a screw located in threading relation between said first and second dies.

References Cited

UNITED STATES PATENTS

| | | | |
|---|---|---|---|
| 1,232,876 | 7/1917 | Wilcox | 72—469 X |
| 1,972,225 | 9/1934 | Hogue | 72—90 X |
| 3,453,851 | 7/1969 | Morse | 72—88 X |

MILTON S. MEHR, Primary Examiner

U.S. Cl. X.R.

10—4